US012574084B2

(12) United States Patent
Song et al.

(10) Patent No.: US 12,574,084 B2
(45) Date of Patent: Mar. 10, 2026

(54) BEAMFORMING SOLUTION FOR FDD MIMO COMMUNICATION

(71) Applicant: Nokia Solutions and Networks Oy, Espoo (FI)

(72) Inventors: Nuan Song, Shanghai (CN); Rana Ahmed Salem, Munich (DE); Tao Yang, Shanghai (CN); Yan Zhao, Shanghai (CN); Hao Liu, Shanghai (CN)

(73) Assignee: Nokia Solutions and Networks Oy, Espoo (FI)

( * ) Notice: Subject to any disclaimer, the term of this patent is extended or adjusted under 35 U.S.C. 154(b) by 325 days.

(21) Appl. No.: 18/555,400

(22) PCT Filed: Apr. 21, 2021

(86) PCT No.: PCT/CN2021/088776
§ 371 (c)(1),
(2) Date: Oct. 13, 2023

(87) PCT Pub. No.: WO2022/222074
PCT Pub. Date: Oct. 27, 2022

(65) Prior Publication Data
US 2024/0195474 A1    Jun. 13, 2024

(51) Int. Cl.
*H04B 7/06* (2006.01)
*H04L 5/00* (2006.01)
(52) U.S. Cl.
CPC ......... *H04B 7/0617* (2013.01); *H04B 7/0634* (2013.01); *H04L 5/0051* (2013.01)
(58) Field of Classification Search
CPC .. H04B 7/0617; H04B 7/0634; H04B 7/0408; H04L 5/0051
See application file for complete search history.

(56) References Cited

U.S. PATENT DOCUMENTS

| | | | |
|---|---|---|---|
| 9,444,558 B1 * | 9/2016 | Carbone | ............... H04W 24/08 |
| 10,148,330 B2 * | 12/2018 | Jiang | ................... H04B 7/0617 |

(Continued)

FOREIGN PATENT DOCUMENTS

| | | |
|---|---|---|
| CN | 102710363 A | 10/2012 |
| EP | 1344332 B1 | 3/2010 |

(Continued)

OTHER PUBLICATIONS

Search Report for European Application No. 21937317.2 dated Jan. 13, 2025.

(Continued)

*Primary Examiner* — Abdullahi Ahmed
(74) *Attorney, Agent, or Firm* — Harness, Dickey & Pierce, P.L.C.

(57) ABSTRACT

Embodiments of the present disclosure relate to a beamforming solution for FDD MIMO communication. A first device receives a reference signal from a second device in a first channel, and determines a covariance matrix associated with the first channel. The first device determines a set of beamforming vectors from the covariance matrix based on the number of dominant angles of arrival associated with the reference signal and the number of beams associated with the set of beamforming vectors, and performs a transmission to the second device based on the set of beamforming vectors in a second channel. In this way, beamforming vectors can be calculated from the transformed channel covariance matrix with the angular spread and imperfect reciprocity considered.

15 Claims, 6 Drawing Sheets

(56)　　　　　　References Cited

U.S. PATENT DOCUMENTS

| | | | |
|---|---|---|---|
| 2010/0008268 A1 | 1/2010 | Whinnett et al. | |
| 2019/0260459 A1* | 8/2019 | Jeon ........................ | H04B 7/08 |
| 2019/0326959 A1* | 10/2019 | Davydov ............. | H04B 7/0469 |
| 2020/0067592 A1* | 2/2020 | Vitthaladevuni .... | H04B 7/0865 |
| 2020/0162117 A1* | 5/2020 | Sandberg ............. | H04B 7/0456 |
| 2022/0060232 A1* | 2/2022 | Zhu ..................... | H04B 7/0452 |

FOREIGN PATENT DOCUMENTS

| | | |
|---|---|---|
| WO | WO-2016202280 A1 | 12/2016 |
| WO | WO-2017219739 A1 | 12/2017 |

OTHER PUBLICATIONS

International Search Report for International Application No. PCT/CN2021/088776 dated Jan. 19, 2022.

Qualcomm Incorporated. "Uplink MIMO Transmission Schemes RI-1610148" 3GPP TSG-RAN WGJ #86bis, Oct. 14, 2016 (Oct. 14, 2016).

* cited by examiner

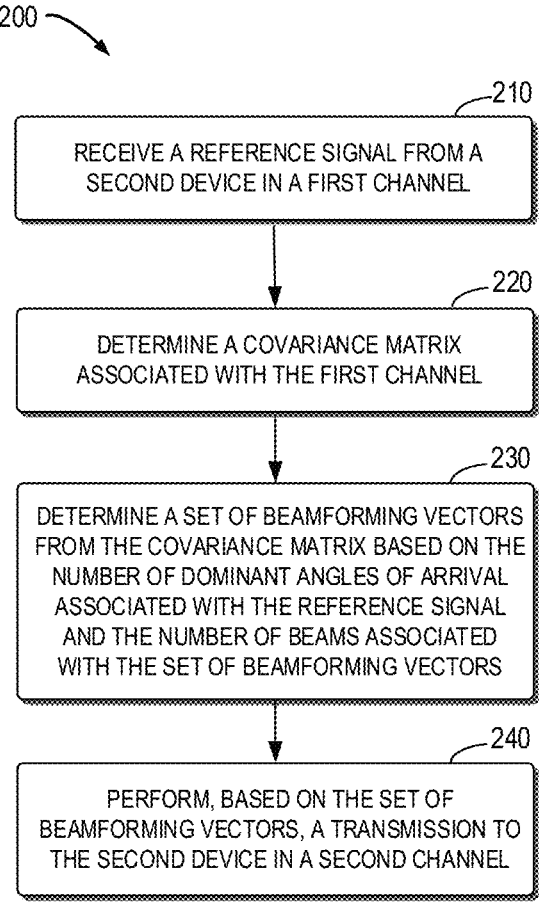

200

210

RECEIVE A REFERENCE SIGNAL FROM A
SECOND DEVICE IN A FIRST CHANNEL

220

DETERMINE A COVARIANCE MATRIX
ASSOCIATED WITH THE FIRST CHANNEL

230

DETERMINE A SET OF BEAMFORMING VECTORS
FROM THE COVARIANCE MATRIX BASED ON THE
NUMBER OF DOMINANT ANGLES OF ARRIVAL
ASSOCIATED WITH THE REFERENCE SIGNAL
AND THE NUMBER OF BEAMS ASSOCIATED
WITH THE SET OF BEAMFORMING VECTORS

240

PERFORM, BASED ON THE SET OF
BEAMFORMING VECTORS, A TRANSMISSION TO
THE SECOND DEVICE IN A SECOND CHANNEL

Fig. 2

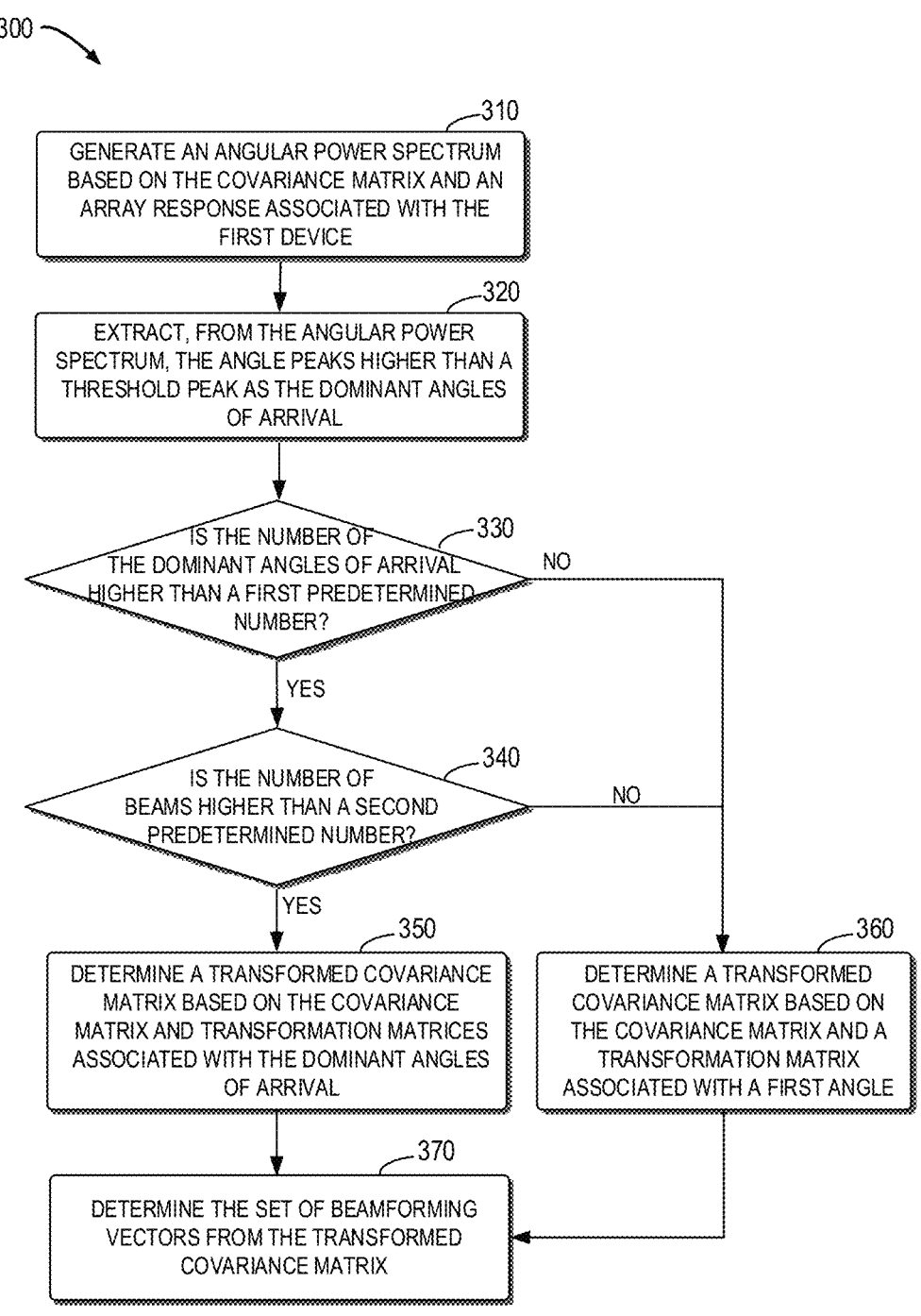

300

310
GENERATE AN ANGULAR POWER SPECTRUM BASED ON THE COVARIANCE MATRIX AND AN ARRAY RESPONSE ASSOCIATED WITH THE FIRST DEVICE

320
EXTRACT, FROM THE ANGULAR POWER SPECTRUM, THE ANGLE PEAKS HIGHER THAN A THRESHOLD PEAK AS THE DOMINANT ANGLES OF ARRIVAL

330
IS THE NUMBER OF THE DOMINANT ANGLES OF ARRIVAL HIGHER THAN A FIRST PREDETERMINED NUMBER?

NO

YES

340
IS THE NUMBER OF BEAMS HIGHER THAN A SECOND PREDETERMINED NUMBER?

NO

YES

350
DETERMINE A TRANSFORMED COVARIANCE MATRIX BASED ON THE COVARIANCE MATRIX AND TRANSFORMATION MATRICES ASSOCIATED WITH THE DOMINANT ANGLES OF ARRIVAL

360
DETERMINE A TRANSFORMED COVARIANCE MATRIX BASED ON THE COVARIANCE MATRIX AND A TRANSFORMATION MATRIX ASSOCIATED WITH A FIRST ANGLE

370
DETERMINE THE SET OF BEAMFORMING VECTORS FROM THE TRANSFORMED COVARIANCE MATRIX

Fig. 3

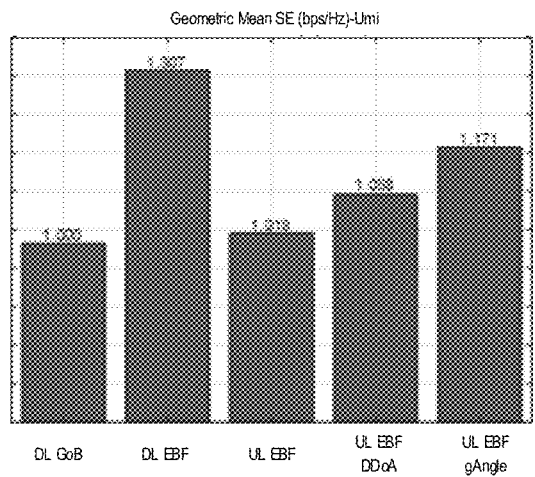
Fig. 4A
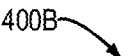
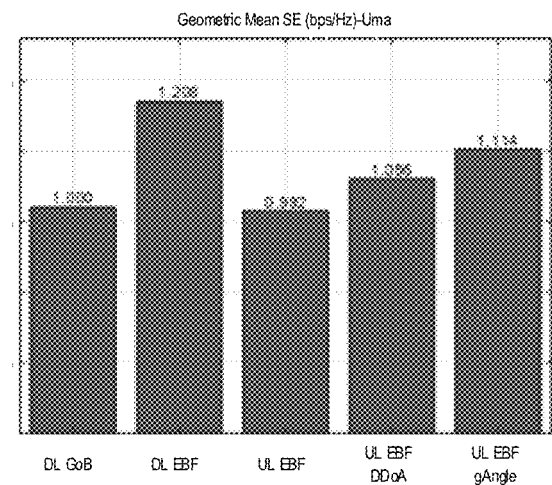
Fig. 4B

500

600

COMMMUNICATION MODULE
640

PROCESSOR
610

MEMORY
620

RAM
622

ROM
624
630

BEAMFORMING SOLUTION FOR FDD MIMO COMMUNICATION

CROSS-REFERENCE TO RELATED APPLICATIONS

This application is a national phase under 35 U.S.C. § 371 of PCT International Application No. PCT/CN2021/088776 which has an International filing date of Apr. 21, 2021, the entire contents of each of which are hereby incorporated by reference.

FIELD

Embodiments of the present disclosure generally relate to the field of telecommunication and in particular, to a beamforming solution for a frequency division duplexing (FDD) multiple input multiple output (MIMO) communication.

BACKGROUND

Current FDD MIMO products based on a grid of beam (GoB) solution still need performance enhancements. Eigen beamforming (EBF) is considered as one potential feature for next FDD MIMO products. To implement EBF in FDD, information on a downlink (DL) channel is required at a network device. Unlike time division duplexing (TDD) where channel reciprocity holds, channel state information (CSI) measured from an uplink (UL) channel in FDD cannot be directly applied to DL beamforming design. The DL beamforming design has to rely on CSI feedback from a terminal device, which will lead to a very large overhead.

Recently, channel reciprocity between UL and DL has been investigated for FDD and the investigation shows that partial reciprocity can be utilized in FDD for MIMO enhancements. However, the utilization of the partial reciprocity in FDD MIMO is incomplete and needs to be optimized.

SUMMARY

In general, example embodiments of the present disclosure provide a beamforming solution for FDD MIMO communication.

In a first aspect, there is provided a first device. The first device comprises: at least one processor: and at least one memory including computer program codes. The at least one memory and the computer program codes are configured to, with the at least one processor, cause the first device to: receive a reference signal from a second device in a first channel; determine a covariance matrix associated with the first channel; determine a set of beamforming vectors from the covariance matrix based on the number of dominant angles of arrival associated with the reference signal and the number of beams associated with the set of beamforming vectors; and perform a transmission to the second device based on the set of beamforming vectors in a second channel.

In a second aspect, there is provided a method for communication. The method comprises: receiving, at a first device, a reference signal from a second device in a first channel: determining a covariance matrix associated with the first channel: determining a set of beamforming vectors from the covariance matrix based on the number of dominant angles of arrival associated with the reference signal and the number of beams associated with the set of beamforming vectors: and performing a transmission to the second device based on the set of beamforming vectors in a second channel.

In a third aspect, there is provided an apparatus for communication. The apparatus comprises: means for receiving, at a first device, a reference signal from a second device in a first channel: means for determining a covariance matrix associated with the first channel: means for determining a set of beamforming vectors from the covariance matrix based on the number of dominant angles of arrival associated with the reference signal and the number of beams associated with the set of beamforming vectors: and means for performing a transmission to the second device based on the set of beamforming vectors in a second channel.

In a fourth aspect, there is provided a non-transitory computer readable medium. The non-transitory computer readable medium comprises program instructions for causing an apparatus to perform the method according to the second aspect.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where:

FIG. 2 illustrates a flowchart illustrating an example method for communication according to some embodiments of the present disclosure:

FIG. 3 illustrates a flowchart illustrating an example method for determining a set of beamforming vectors according to some embodiments of the present disclosure:

FIG. 4A illustrates a diagram illustrating an example comparison of geometric mean spectral efficiency (SE) performance among beamforming schemes under an urban micro (Umi) channel model:

FIG. 4B illustrates a diagram illustrating an example comparison of geometric mean SE performance among beamforming schemes under an urban macro (Uma) channel model:

Throughout the drawings, the same or similar reference numerals represent the same or similar element.

DETAILED DESCRIPTION

Figure 1:
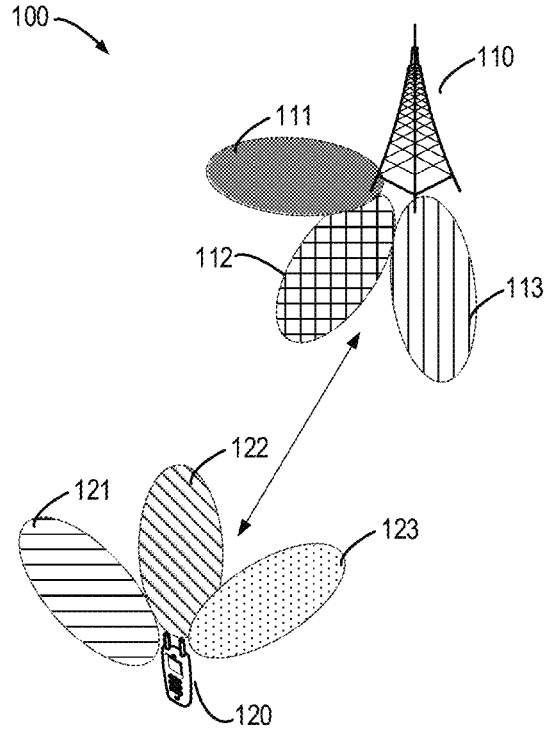
FIG. 1 illustrates an example communication network in which example embodiments of the present disclosure may be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR NB (also referred to as a gNB), a Remote Radio Unit (RRU), a radio header (RH), a remote radio head (RRH), a relay, a low power node such as a femto, a pico, and so forth, depending on the applied terminology and technology.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VOIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. In the following description, the terms "terminal device", "communication device", "terminal", "user equipment" and "UE" may be used interchangeably.

In the third generation partnership project (3GPP) Rel-17, a FDD MIMO communication is expected to rely on exploiting FDD reciprocity in spatial domain. The performance of the whole system will depend on quality of CSI at a network device, which will be obtained by observing UL sounding reference signal (SRS) signals from a terminal device. Hence, enhancing compensation schemes will be crucial to guarantee reliable quality of DL CSI at the network device to apply spatial beamforming.

As mentioned above, the partial reciprocity can be utilized in FDD for MIMO enhancements. The key problem to be solved in EBF for FDD using partial reciprocity is a channel covariance transformation from UL to DL or from DL to UL.

In a conventional solution, a covariance transformation method using dominant direction of arrival (DoA) (also referred to as the maximum DoA) is proposed to transform uplink channel covariance to its downlink counterpart. This method only compensates the phase relation properly if there is one DoA. If there is moderate or large angular spread around the dominant angle due to scattering, the reciprocity will be influenced and different DoAs will be caused. Accordingly, the performance will be degraded. In this case, using only the maximum DoA may be inaccurate for the channel covariance transformation.

In order to solve the above and other potential problems, embodiments of the present disclosure provide a generalized solution of exploring the reciprocity to transform a channel covariance matrix from UL to DL or from DL to UL. In the solution, if multiple dominant angles of arrival present, the multiple dominant angles of arrival can be considered to transform the channel covariance matrix instead of only considering the maximum angle. In this way, beamforming vectors can be calculated from the transformed channel covariance matrix with the angular spread and imperfect reciprocity considered.

Some example embodiments of the present disclosure will now be described in detail with reference to the figures. However, those skilled in the art would readily appreciate that the detailed description given herein with respect to these figures is for explanatory purpose as the present disclosure extends beyond theses limited embodiments.
Example of Communication Network FIG. 1 illustrates an example communication network 100 in which embodiments of the present disclosure can be implemented. According to embodiments of the present disclosure, the communication network 100 may involve FDD MIMO communication. As shown in FIG. 1, the communication network 100 includes a first device 110 and a second device 120 served by the first device 110. The first device 110 and the second device 120 may communicate with each other via a channel such as a wireless communication channel.

As shown in FIG. 1, the first device 110 may have a plurality of beams such as beams 111, 112 and 113, and the second device 120 may have a plurality of beams such as beams 121, 122 and 123. A channel (or called as a sub-channel in this case) may be formed between one of beams 111, 112 and 113 and one of beams 121, 122 and 123. The first device 110 may transmit information to the second device 120 or receive information from the second device 120 via one or more of the beams 111, 112 and 113. The second device 120 may transmit information to the first device 110 or receive information from the first device 110 via one or more of the beams 121, 122 and 123. The number of the beams is not limited to that shown in FIG. 1, and more or less beams are also feasible.

For illustration, the first device 110 is shown as a network device and the second device 120 is shown as a terminal device. Merely for illustration purpose and without suggesting any limitations as to the scope of the present disclosure, some embodiments will be described in the context where the first device 110 is a network device and the second device 120 is a terminal device. It is to be understood that, in other embodiments, the first device 110 may be a terminal device and the second device 120 may be a network device. In other words, the principles and spirits of the present disclosure can be applied to both uplink and downlink transmissions.

It is also to be understood that the number of first and second devices as shown in FIG. 1 are only for the purpose of illustration without suggesting any limitations. The network 100 may include any suitable number of first and second devices adapted for implementing embodiments of the present disclosure.

The communications in the network 100 may conform to any suitable standards including, but not limited to, LTE, LTE-evolution, LTE-advanced (LTE-A), wideband code division multiple access (WCDMA), code division multiple access (CDMA) and global system for mobile communications (GSM) and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols.

In some scenarios, the first device 110 may receive an UL reference signal (RS) such as a SRS from the second device 120 in a first channel. Based on the reception of the UL RS, the first device 110 may perform channel estimation to obtain an UL channel covariance matrix. Then the first device 110 may transform the UL channel covariance matrix to its DL counterpart so as to determine DL beamforming vectors. Based on the DL beamforming vectors, the first device 110 may perform a transmission to the second device 120 in a second channel. In this case, the first channel is an UL channel, and the second channel is a DL channel. The first channel and second channel may have respective carrier frequencies.

In some other scenarios, the second device 120 may receive a DL RS such as a CSI-RS from the first device 110 in a first channel. Based on the reception of the DL RS, the second device 120 may perform channel estimation to obtain a DL channel covariance matrix. Then the second device 120 may transform the DL channel covariance matrix to its UL counterpart so as to determine UL beamforming vectors. Based on the UL beamforming vectors, the second device 120 may perform a transmission to the first device 110 in a second channel. In this case, the first channel is a DL channel, and the second channel is an UL channel. The first channel and second channel may have different carrier frequencies.

A conventional solution only uses the maximum dominant angle of arrival to transform the channel covariance matrix. This solution is only limited to the dominant angle case, without considering the angular spread situations due to for example scattering.

In view of this, embodiments of the present disclosure provide a solution for performing a channel covariance transformation with the angular spread and imperfect reciprocity considered. In the present solution, the implementation of multi-angle determination and accumulative multiple transformation of the UL channel covariance matrix can be carried out, if the considered number of beamforming vectors is greater than a first predetermined number and the number of detected angle peaks in the APS is greater than a second predetermined number. In particular, in order to detect whether a second peak is significant or not, a threshold $\gamma_{th}$ is applied so as to compare the threshold with the strongest peak. For example, if a second peak $p_2$ is greater than $\gamma_{th} \times p_1$, where $p_1$ is the strongest peak, then the multi-angle compensation according to the present solution is applied. More details will be described below in connection with FIGS. 2 to 5.

Example Implementation of Beamforming

FIG. 2 illustrates a flowchart illustrating an example method 200 for communication according to some embodiments of the present disclosure. The method 200 can be implemented at the first device 110 or the second device 120 shown in FIG. 1. For the purpose of discussion, the method 200 will be described with reference to FIG. 1 and assuming that the method 200 is implemented at the first device 110. It is to be understood that the method 200 may further include additional blocks not shown and/or omit some shown blocks, and the scope of the present disclosure is not limited in this regard.

As shown in FIG. 2, at block 210, the first device 110 receives a RS from the second device 120 in a first channel. In some embodiments, the first channel may be an UL channel. In some embodiments, the first channel may be a DL channel.

In some embodiments where the first device 110 is a network device and the second device 120 is a terminal device, i.e., the first channel is an UL channel, the RS may be an UL RS. For example, the UL RS may be a SRS, a demodulation reference signal (DMRS) or any other suitable UL RSs existing or to be developed. In some embodiments where the first device 110 is a terminal device and the second device 120 is a network device, i.e., the first channel is a DL channel, the RS may be a DL RS. For example, the DL RS may be a CSI-RS, cell reference signal (CRS), DMRS, PRS or any other suitable DL RSs existing or to be developed.

At block 220, the first device 110 determines a covariance matrix associated with the first channel. For example, the first device 110 may perform channel estimation for the first channel to obtain the covariance matrix. It is to be understood that any suitable ways are feasible to obtain the covariance matrix.

At block 230, the first device 110 determines a set of beamforming vectors from the covariance matrix based on the number of dominant angles of arrival associated with the RS and the number of beams associated with the set of beamforming vectors. According to embodiments of the present disclosure, if multiple dominant angles of arrival present, the multiple dominant angles of arrival can be used to transform the covariance matrix for beamforming design in FDD. In this way, a higher robustness against the angular spread and imperfect reciprocity in FDD MIMO communication can be achieved.

In some embodiments, the beamforming vectors may be EBF vectors. Of course, the beamforming vectors may be vectors for any other suitable beamforming schemes.

In some embodiments, the first device 110 may determine the dominant angles of arrival. For example, the first device 110 may determine the dominant angles of arrival based on an APS. Of course, any other suitable ways are also feasible to determine the dominant angles of arrival.

In some embodiments, if the number of the dominant angles of arrival is higher than a first predetermined number and the number of beams is higher than a second predetermined number, the first device 110 may determine the set of beamforming vectors based on the covariance matrix and transformation matrices associated with the dominant angles of arrival. In other words, the first device 110 may determine the set of beamforming vectors based on multiple dominant angles of arrival.

In some embodiments, if the number of the dominant angles of arrival is equal to or lower than the first predetermined number or the number of beams is equal to or lower than the second predetermined number, the first device 110 may determine the set of beamforming vectors based on the covariance matrix and a transformation matrix associated with a first angle among the dominant angles of arrival. In other words, the first device 110 may determine the set of beamforming vectors based on a single dominant angle of arrival.

For clarity, more detailed description will be made on the determination of the set of beamforming vectors below with reference to FIG. 3. FIG. 3 illustrates a flowchart illustrating an example method 300 for determining a set of beamforming vectors according to some embodiments of the present disclosure. The method 300 can be implemented at the first device 110 or the second device 120 shown in FIG. 1. For the purpose of discussion, the method 300 will be described with reference to FIG. 1 and assuming that the method 300 is implemented at the first device 110. It is to be understood that the method 300 may further include additional blocks not shown and/or omit some shown blocks, and the scope of the present disclosure is not limited in this regard.

As shown in FIG. 3, at block 310, the first device 110 may generate an APS based on the covariance matrix and an array response associated with the first device 110. In some embodiments, the first device 110 may calculate the APS by using Bartlett beamforming as shown in equation (1) below:

$$\rho_U(\theta) = a_U^H(\theta) R_U a_U(\theta) \tag{1}$$

where $\rho_U(\theta)$ denotes the APS for the angle $\theta$, $a_U(\theta)$ denotes the array response at the carrier frequency of the first channel for the angle $\theta$, and $R_U$ denotes the covariance matrix. It is to be noted that this is merely an example, and the APS can also be generated by any other suitable ways.

At block 320, the first device 110 may extract, from the APS, the angle peaks higher than a threshold peak as the dominant angles of arrival. In some embodiments, the threshold peak may be predefined. In some embodiments, the threshold peak may be preconfigured or configured.

In some embodiments, the dominant angles of arrival can be obtained by determining the angles corresponding to r peaks of the APS. For convenience, the dominant angles of arrival are denoted as $\theta_m$, $m=1 \ldots r$, where r denotes a positive integer. For example, the determination of peaks may be carried out according to equation (2) below.

$$\theta_m: \text{peak}(|\rho_U(\theta)|) > \gamma_{th} \cdot |\rho_U(\theta_{max})|, \forall \theta \tag{2}$$

where $\rho_U(\theta)$ denotes the APS for the angle $\theta$, $\gamma_{th}$ denotes the threshold peak and may be chosen such as $\gamma_{th} = 0.1$, and $|\rho_U(\theta_{max})|$ corresponds to the strongest peak.

At block 330, the first device 110 may determine whether the number of the dominant angles of arrival is higher than the first predetermined number. In some embodiments, the first predetermined number may be one. Of course, the first predetermined number may be any other suitable number.

If the number of the dominant angles of arrival is higher than the first predetermined number, the process may proceed to block 340. At block 340, the first device 110 may determine whether the number of beams is higher than the second predetermined number. In some embodiments, the second predetermined number may be one. Of course, the second predetermined number may be any other suitable number. In some embodiments where a cross-polarization array is used, the first device 110 may determine, for each polarization, whether the number of beams is higher than the second predetermined number.

If the number of beams is higher than the second predetermined number, the process may proceed to block 350. At block 350, the first device 110 may determine a transformed covariance matrix based on the covariance matrix and transformation matrices associated with the dominant angles of arrival. For example, the first device 110 may determine the transformed covariance matrix as shown in equation (3) below.

$$\hat{R}_D = \frac{1}{r}\sum_{m=1}^{r} T(\theta_m)R_U T^H(\theta_m) \tag{3}$$

where $\hat{R}_D$ denotes the transformed covariance matrix, r denotes the number of the dominant angles of arrival, $R_U$ denotes the covariance matrix, and $T(\theta_m)$ denotes a transformation matrix for the angle $\theta_m$. In some embodiments, $T(\theta)$ may be diagonal and calculated by array responses as shown in equation (4) below.

$$[T(\theta)]_{nn} = \frac{[a_D(\theta)]_n}{[a_U(\theta)]_n} \tag{4}$$

where $[X]_{nn}$, $[x]_n$ denotes the n-th row, n-th column of a matrix X and and the n-th element of a vector x, respectively, $a_U(\theta)$ denotes the array response at the carrier frequency of the first channel for the angle $\theta$, and $a_D(\theta)$ denotes the array response at the carrier frequency of the second channel for the angle $\theta$.

If determining, at block 330, that the number of the dominant angles of arrival is equal to or lower than the first predetermined number, the process may proceed to block 360. If determining, at block 340, that the number of beams is equal to or lower than the second predetermined number, the process may also proceed to block 360.

At block 360, the first device 110 may determine a transformed covariance matrix based on the covariance matrix and a transformation matrix associated with an angle (for convenience, also referred to as a first angle herein) among the dominant angles of arrival. In some embodiments, the first angle may be the maximum angle among the dominant angles of arrival. For example, the first device 110 may determine the transformed covariance matrix as shown in equation (5) below.

$$\hat{R}_D = T(\theta_{max})R_U T^H(\theta_{max}) \tag{5}$$

where $\theta_{max}$ is the maximum angle among the dominant angles of arrival, $\hat{R}_D$ denotes the transformed covariance matrix, $R_U$ denotes the covariance matrix, and $T(\theta_{max})$ denotes a transformation matrix for the angle $\theta_{max}$.

In some alternative embodiments, the first angle may be the second largest angle among the dominant angles of arrival. Of course, any other suitable angle among the dominant angles of arrival is also feasible.

Upon determination of the transformed covariance matrix, the process may proceed to block 370. At block 370, the first device 110 may determine the set of beamforming vectors from the transformed covariance matrix. In some embodiments, the first device 110 may apply eigen value decomposition (EVD) on the transformed covariance matrix, as shown in equation (6):

$$\hat{R}_D = \hat{V}_D\hat{\Sigma}_D\hat{V}_D^H \tag{6}$$

where $\hat{R}_D$ denotes the transformed covariance matrix, $\hat{V}_D$ denotes a matrix of eigenvectors, and $\hat{\Sigma}_D$ denotes a matrix with eigenvalues on its diagonals.

Then first device 110 may determine the set of beamforming vectors as shown in equation (7):

$$W_D = \hat{V}_D(:,1:s) \tag{7}$$

where $W_D$ denotes the set of beamforming vectors, and s denotes the number of beams (i.e., the number of beamforming vectors). It is to be noted that this is merely an example, and any other suitable ways are also feasible to determine the set of beamforming vectors from the transformed covariance matrix.

Below, more detailed description will be made on the covariance matrix transformation, i.e., the derivation of the above equations (3) and (5). Assuming that the first device 110 has N antenna elements. The array response for uniform linear array with the N antenna elements may be written as equation (8):

$$a(\theta) = \begin{bmatrix} 1 \\ e^{-j2\pi\frac{d}{c}f_c sin(\theta)} \\ \vdots \\ e^{-j2\pi(N-1)\frac{d}{c}f_c sin(\theta)} \end{bmatrix} \in C^N \tag{8}$$

where $a(\theta)$ denotes the array response in the first or second channel for the angle $\theta$, $f_c$ denotes a carrier frequency of the first or second channel, c denotes the speed of the light, d denotes the distance between two adjacent antenna elements (assumed the same for both UL and DL). It is to be understood that if $f_c$ denotes a carrier frequency of the first channel, $a(\theta)$ corresponds to $a_U(\theta)$ in equation (4). If $f_c$ denotes a carrier frequency of the second channel, $a(\theta)$ corresponds to $a_D(\theta)$ in equation (4).

The relationship between UL and DL transformation with respect to the array response can be expressed as equation (9) below.

$$a_D(\theta_j) = T(\theta_j)a_U(\theta_j) \tag{9}$$

where $a_U(\theta_j)$ denotes the array response at the carrier frequency of the first channel for the angle $\theta_j$, and $a_D(\theta_j)$ denotes the array response at the carrier frequency of the second channel for the angle $\theta_j$. $T(\theta_j)$ denotes the general transformation matrix written by equation (10) below.

$$T(\theta_j) = \begin{bmatrix} 1 & & & \\ & e^{-j2\pi\frac{d}{c}(f_D-f_U)sin(\theta_j)} & & \\ & & \ddots & \\ & & & e^{-j2\pi(N-1)\frac{d}{c}(f_D-f_U)sin(\theta_j)} \end{bmatrix} \in C^{N\times N} \tag{10}$$

where $f_D$ denotes a carrier frequency of the second channel, and $f_U$ denotes a carrier frequency of the first channel, c denotes the speed of the light, d denotes the distance between two adjacent antenna elements (assumed the same for both UL and DL), and N denotes the number of antenna elements of the first device 110.

The covariance matrix for UL may be respectively written as equation (11) below.

$$R_U = \int_\Omega \rho_U(\theta)a_U(\theta)a_U^N(\theta)d\theta \tag{11}$$

where $R_U$ denotes the covariance matrix for UL, $\rho_U(\theta)$ corresponds to UL APS function, and $a_U(\theta)$ denotes the array response at the carrier frequency of the first channel for the angle $\theta$.

11                                                                    12

The covariance matrix for DL may be respectively written as equation (12) below.

$$R_D = \int_\Omega \rho_D(\theta) a_D(\theta) a_D{}^H(\theta) d\theta \qquad (12)$$

where $R_D$ denotes the covariance matrix for DL, $\rho_D(\theta)$ corresponds to DL APS function, and $a_D(\theta)$ denotes the array response at the carrier frequency of the second channel for the angle $\theta$.

Generally, $\rho_U(\theta) \approx_D(\theta)$ holds for FDD reciprocity. Based on the above, equation (13) can be obtained.

$$R_D \approx \int_\Omega \rho_D(\theta) T(\theta) a_U(\theta) a_U{}^H(\theta) T^H(\theta) d\theta \qquad (13)$$

where $R_D$ denotes the covariance matrix for DL, $\rho_U(\theta)$ corresponds to UL APS function, and $a_U(\theta)$ denotes the array response at the carrier frequency of the first channel for the angle $\theta$, and $T(\theta)$ denotes a transformation matrix. $T(\theta)$ may also be considered as the rotation matrix with respect to the dedicated angle.

In case that the maximum complex phase shift using the dominant angles of arrival is considered, equation (5) can be obtained from equation (13). The effect of the rotation or transformation does not significantly influence the subspaces of the channel covariance and can also be considered as sampling of the covariance matrix. When there is larger angular spread, such a transformation may not be effective. Thus, multiple transformations as depicted in equation (3) are considered, which can maintain the dominant subspace of the channel but adjust the phases of beamforming vectors that can better adapt to the cases in the presence of larger angular spread and imperfect reciprocity.

Although the above description is made in connection with uniform linear array, the covariance matrix transformation according to embodiments of the present disclosure may also be applied to uniform rectangular array (URA). In some embodiments for the URA, an efficient implementation to calculate the covariance matrix and estimate the dominant angles of arrival is separating the azimuth and elevation array response vectors, denoted by $R_H$ and $R_V$ as well as $a_H$ and $a_V$, respectively. In other words, each dimension is separately compensated. The corresponding angle extraction and covariance transformation are implemented separately. The beamforming vectors will also be obtained from azimuth and elevation channel covariance and the Kronecker product of both directions will be the final beamforming vectors.

Once the computational complexity of the products can bear the joint two dimensional (2D) calculation of the channel covariance matrix, the implementation of covariance matrix transformation in 2D can be represented by equation (14) below.

$$\hat{R}_D = \frac{1}{r} \sum_{m=1}^r T(\theta_m, \phi_m) R_U T^H(\theta_m, \phi_m) \qquad (14)$$

where $\hat{R}_D$ denotes the transformed covariance matrix, r denotes the number of the dominant angles of arrival, $R_U$ denotes the covariance matrix, $\theta_m$, $\phi_m$ denote the determined angle peaks from the UL 2D APS in azimuth and elevation directions, and $T(\theta_m, \phi_m)$ denotes a transformation matrix for the azimuth and elevation angle peaks $\theta_m$, $\phi_m$. The 2D APS may be written as equation (15) below.

$$\rho_U(\theta,\phi) = a_U{}^H(\theta,\phi) R_U a_U(\theta,\phi) \qquad (15)$$

where $\rho_U(\theta,\phi)$ denotes the APS for the azimuth and elevation angles $\theta$, $\phi$, $a_U(\theta,\phi)$ denotes the array response at the carrier frequency of the first channel for the azimuth and elevation angles $\theta$, $\phi$, and $R_U$ denotes the covariance matrix.

The transformation matrix in 2D case $T(\theta,\phi)$ may be similarly calculated by array responses in the first and second channels as shown in equation (16) below.

$$[T(\theta, \phi)]_{nn} = \frac{[a_D(\theta, \phi)]_n}{[a_U(\theta, \phi)]_n} \qquad (16)$$

where $[X]_{nn}$. $[x]_n$ denotes the n-th row, n-th column of a matrix X and and the n-th element of a vector x, respectively. $T(\theta,\phi)$ denotes a transformation matrix for the azimuth and elevation angles $\theta$, $\phi$. $a_U(\theta, \phi)$ denotes the array response at the carrier frequency of the first channel for the azimuth and elevation angles $\theta$, $\phi$, and $a_D(\theta,\phi)$ denotes the array response at the carrier frequency of the second channel for the azimuth and elevation angles $\theta$, $\phi$.

The corresponding beamforming vectors may be obtained from the complete transformed covariance matrix by equation (14).

So far, the determination of the set of beamforming vectors is described. With reference back to FIG. 2, at block 240, the first device 110 performs a transmission to the second device 120 based on the set of beamforming vectors in a second channel. In some embodiments where the first channel is an UL channel, the second channel may be a DL channel. In some embodiments where the first channel is a DL channel, the second channel may be an UL channel.

In some embodiments, the first device 110 may transmit another RS to the second device 120 based on the set of beamforming vectors. For example, the first device 110 may transmit a CSI-RS to the second device 120. In some alternative embodiments, the first device 110 may transmit data to the second device 120 based on the set of beamforming vectors. It is to be understood that the present disclosure does not make limitation for this, and the set of beamforming vectors may be used for any suitable transmission.

According to the solution described in connection with FIGS. 2 and 3, a higher robustness against the angular spread and imperfect reciprocity in the FDD MIMO communication can be provided. With reference to FIGS. 4A and 4B, the description will be made on evaluation of the performance of the present solution in the case where larger angular spread or multiple dominant angles of arrival happen.

FIG. 4A illustrates a diagram 400A illustrating an example comparison of geometric mean SE performance among beamforming schemes under an Umi channel model. FIG. 4B illustrates a diagram 400B illustrating an example comparison of geometric mean SE performance among beamforming schemes under an Uma channel model. Here, zero-forcing precoding is applied on the first stage and different beamforming schemes are applied on the second stage. In FIGS. 4A and 4B, the solution "DL EBF" refers to the upper bound solution, where a DL channel is directly used to calculate the EBF vectors. The solution "DL GoB" refers to the GoB based FDD MIMO solution (DFT codebook with oversampling factor 4). The solution "UL EBF gAngle" refers to the present solution by applying multiangle based covariance transformation. The solution "UL EBF DDoA" refers to the solution where only one dominant direction of arrival is used for covariance transformation. The solution "UL EBF" refers to the case where EBF vectors are calculated directly from an UL. An example of simulation parameters is listed in Table 1. The simulation parameters include channel model parameters and an array geometry used.

TABLE 1

| An Example of Simulation Parameters Simulation Parameters | |
| --- | --- |
| Channel model | sub-6 GHz in 3GPP TR 38.901 |
| Scenario | NR-Umi/Uma |
| Carrier frequency (DL/UL) | 2.15/1.75 GHz |
| Bandwidth | 20 MHz |
| BS Tx Antenna | 192 AEs (12 × 8 × 2)→ 64 TXRUs (4 × 8 × 2) |
| UE Rx Antenna | 2 AEs ports (1 × 1 × 2) |

The spatial beamforming was applied to aggregate the 64 transceiver units (TXRUs) into 4 antenna ports. Explicit CSI feedback is sent from the second device 120 to the first device 110 in order to build the ZF MU-MIMO precoder. Rank 2 transmission was assumed. A threshold $\gamma_{th}$=0.1 was used here to switch between the solution "UL EBF gAngle" and the solution "UL EBF DDoA".

It can be observed from each of FIGS. 4A and 4B that the compensation is beneficial for the frequency duplex spacing of 400 MHZ. In the presence of larger angular spread and multiple angles for both Uma and Umi, the present solution "UL EBF gAngle" outperforms the solution "UL EBF DDoA", and achieves 12% to 17% gain as compared to the solution "DL GoB" which is the current FDD MIMO solution and more than 90% performance of the upper bound solution "DL EBF".

Figures 5, 6:
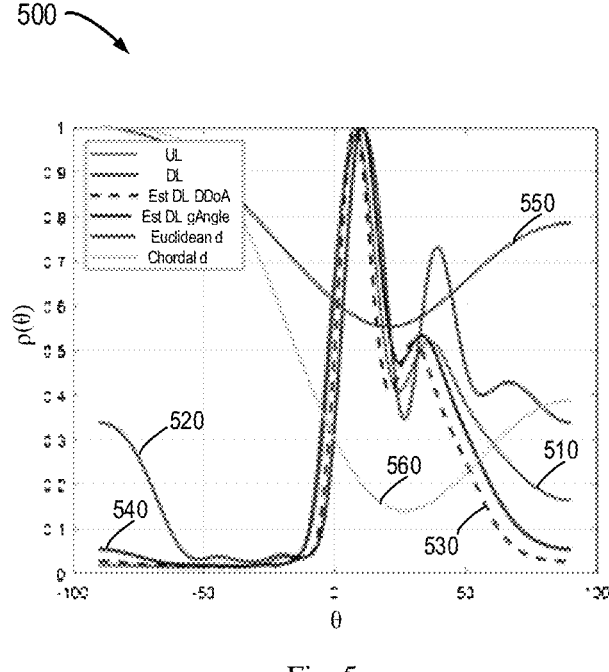
FIG. 5 illustrates a diagram illustrating angular power spectrums (APSs) for various channel covariance solutions and distance measurements between a true DL channel covariance and an UL transformed channel covariance.
FIG. 6 illustrates a simplified block diagram of an apparatus that is suitable for implementing example embodiments of the present disclosure.

FIG. 5 illustrates a diagram 500 illustrating APSs for various channel covariance solutions and distance measurements between a true DL channel covariance and an UL transformed channel covariance. Assuming that a single-angle transformation is carried out $\hat{R}_D$=(θ$_i$)R$_U$T$^{H}$(θ$_i$) for all possible angles θ$_i$, i∈Ω. The UL APS 510, the true DL APS 520, the DDoA based estimated DL APS 530 and gAngle based estimated DL APS 540 (i.e., the present solution) are plotted in FIG. 5. The Euclidean distance 550 and the Chordal distance 560 are calculated between the true DL channel covariance $R_D$ and the UL transformed channel covariance matrix $\hat{R}_D$.

It can be observed that in APS two dominant angles exist and for single-angle transformation, the minimum distance can be observed at the angle which does not correspond to the maximum DoA. Thus, the maximum DoA transformation may not work for multi-angle channel case, and the multi-angle transformation according to the present solution is advantaged over the maximum DoA transformation.
Example Implementation of Apparatus and Device Correspondingly, embodiments of the present disclosure also provide an apparatus and device for communication. In some embodiments, an apparatus capable of performing any of the methods 200 to 300 (for example, the first device 110) may comprise means for performing the respective steps of the methods 200 to 300. The means may be implemented in any suitable form. For example, the means may be implemented in a circuitry or software module.

In some embodiments, the apparatus comprises means for receiving, at a first device, a reference signal from a second device in a first channel: means for determining a covariance matrix associated with the first channel: means for determining a set of beamforming vectors from the covariance matrix based on the number of dominant angles of arrival associated with the reference signal and the number of beams associated with the set of beamforming vectors: and means for performing a transmission to the second device based on the set of beamforming vectors in a second channel.

In some embodiments, the means for determining the set of beamforming vectors may comprise means for determining the dominant angles of arrival: means for determining the set of beamforming vectors based on the covariance matrix and transformation matrices associated with the dominant angles of arrival in accordance with a determination that the number of the dominant angles of arrival is higher than a first predetermined number and the number of beams is higher than a second predetermined number: and means for determining the set of beamforming vectors based on the covariance matrix and a transformation matrix associated with a first angle among the dominant angles of arrival in accordance with a determination that the number of the dominant angles of arrival is equal to or lower than the first predetermined number or the number of beams is equal to or lower than the second predetermined number.

In some embodiments, the means for determining the dominant angles of arrival comprises: means for generating an angular power spectrum based on the covariance matrix and an array response associated with the first device; and means for extracting, from the angular power spectrum, the angle peaks higher than a threshold peak as the dominant angles of arrival.

In some embodiments, the first predetermined number may be one and the second predetermined number may be one. In some embodiments, the first angle may be the maximum angle among the dominant angles of arrival.

In some embodiments, the first device may be a network device, and the second device may be a terminal device. In some embodiments, the first device may be a terminal device, and the second device may be a network device.

FIG. 6 is a simplified block diagram of a device 600 that is suitable for implementing embodiments of the present disclosure. The device 600 may be provided to implement a first device or a second device, for example the first device 110 or the second device 120 as shown in FIG. 1. As shown, the device 600 includes one or more processors 610, one or more memories 620 coupled to the processor 610, and one or more communication modules 640 (such as, transmitters and/or receivers) coupled to the processor 610.

The communication module 640 is for bidirectional communications. The communication module 640 has at least one antenna to facilitate communication. The communication interface may represent any interface that is necessary for communication with other network elements.

The processor 610 may be of any type suitable to the local technical network and may include one or more of the following: general purpose computers, special purpose computers, microprocessors, digital signal processors (DSPs) and processors based on multicore processor architecture, as non-limiting examples. The device 600 may have multiple processors, such as an application specific integrated circuit chip that is slaved in time to a clock which synchronizes the main processor.

The memory 620 may include one or more non-volatile memories and one or more volatile memories. Examples of the non-volatile memories include, but are not limited to, a Read Only Memory (ROM) 624, an electrically programmable read only memory (EPROM), a flash memory, a hard disk, a compact disc (CD), a digital video disk (DVD), and other magnetic storage and/or optical storage. Examples of the volatile memories include, but are not limited to, an random access memory (RAM) 622 and other volatile memories that will not last in the power-down duration.

A computer program 630 includes computer executable instructions that are executed by the associated processor 610. The program 630 may be stored in the ROM 624. The processor 610 may perform any suitable actions and processing by loading the program 630 into the RAM 622.

The embodiments of the present disclosure may be implemented by means of the program 630 so that the device 600 may perform any process of the disclosure as discussed with reference to FIGS. 2 to 3. The embodiments of the present disclosure may also be implemented by hardware or by a combination of software and hardware.

Figure 7:
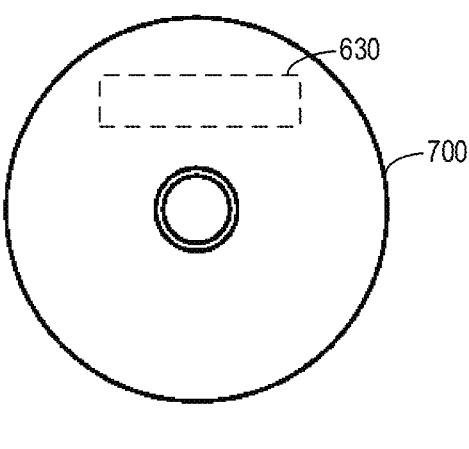
FIG. 7 illustrates a block diagram of an example computer readable medium in accordance with example embodiments of the present disclosure.

In some embodiments, the program 630 may be tangibly contained in a computer readable medium which may be included in the device 600 (such as in the memory 620) or other storage devices that are accessible by the device 600. The device 600 may load the program 630 from the computer readable medium to the RAM 622 for execution. The computer readable medium may include any types of tangible non-volatile storage, such as ROM, EPROM, a flash memory, a hard disk, CD, DVD, and the like. FIG. 7 shows an example of the computer readable medium 700 in form of CD or DVD. The computer readable medium has the program 630 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the methods 200 to 300 as described above with reference to FIGS. 2 to 3. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A first device comprising:

at least one processor; and at least one memory including computer program code, the at least one memory and the computer program code configured to, with the at least one processor, cause the first device to receive a reference signal from a second device in a first channel;

determine a covariance matrix associated with the first channel;

determine a set of beamforming vectors from the covariance matrix based on the number of dominant angles of arrival associated with the reference signal and the number of beams associated with the set of beamforming vectors; and perform a transmission to the second device based on the set of beamforming vectors in a second channel.

2. The first device of claim 1, wherein the first device is caused to determine the set of beamforming vectors by:

determining the dominant angles of arrival;

in accordance with a determination that the number of the dominant angles of arrival is higher than a first number and the number of beams is higher than a second number, determining the set of beamforming vectors based on the covariance matrix and transformation matrices associated with the dominant angles of arrival; and in accordance with a determination that the number of the dominant angles of arrival is equal to or lower than the first number or the number of beams is equal to or lower than the second number, determining the set of beamforming vectors based on the covariance matrix and a transformation matrix associated with a first angle among the dominant angles of arrival.

3. The first device of claim 2, wherein the first device is caused to determine the dominant angles of arrival by:

generating an angular power spectrum based on the covariance matrix and an array response associated with the first device; and extracting, from the angular power spectrum, the angle peaks higher than a threshold peak as the dominant angles of arrival.

4. The first device of claim 2, wherein the first number is one and the second number is one.

5. The first device of claim 2, wherein the first angle is the maximum angle among the dominant angles of arrival.

6. The first device of claim 1, wherein the first device is a network device, and the second device is a terminal device.

7. The first device of claim 1, wherein the first device is a terminal device, and the second device is a network device.

8. A method for communication, comprising:

receiving, at a first device, a reference signal from a second device in a first channel;

determining a covariance matrix associated with the first channel;

determining a set of beamforming vectors from the covariance matrix based on the number of dominant angles of arrival associated with the reference signal and the number of beams associated with the set of beamforming vectors; and performing a transmission to the second device based on the set of beamforming vectors in a second channel.

9. The method of claim 8, wherein determining the set of beamforming vectors comprises:

determining the dominant angles of arrival;

in accordance with a determination that the number of the dominant angles of arrival is higher than a first number and the number of beams is higher than a second number, determining the set of beamforming vectors based on the covariance matrix and transformation matrices associated with the dominant angles of arrival; and in accordance with a determination that the number of the dominant angles of arrival is equal to or lower than the first number or the number of beams is equal to or lower than the second number, determining the set of beamforming vectors based on the covariance matrix and a transformation matrix associated with a first angle among the dominant angles of arrival.

10. The method of claim 9, wherein determining the dominant angles of arrival comprises:

generating an angular power spectrum based on the covariance matrix and an array response associated with the first device; and extracting, from the angular power spectrum, the angle peaks higher than a threshold peak as the dominant angles of arrival.

11. The method of claim 9, wherein the first predetermined number is one and the second number is one.

12. The method of claim 9, wherein the first angle is the maximum angle among the dominant angles of arrival.

13. The method of claim 8, wherein the first device is a network device, and the second device is a terminal device.

14. The method of claim 8, wherein the first device is a terminal device, and the second device is a network device.

15. A non-transitory computer readable medium storing program instructions, which when executed by at least one processor, cause an apparatus including the at least one processor to perform the method according to claim 8.

\* \* \* \* \*